United States Patent
Parisi et al.

(10) Patent No.: US 9,090,746 B2
(45) Date of Patent: Jul. 28, 2015

(54) PROCESS FOR THE REMOVAL OF THE SOLVENT FROM A POLYMERIC SOLUTION

(71) Applicant: VERSALIS S.P.A., San Donato Milanese (IT)

(72) Inventors: Maria Parisi, Ravenna (IT); Piero Maestri, Forlimpopoli (IT)

(73) Assignee: VERSALIS S.P.A., San Donato Milanese (IT)

( * ) Notice: Subject to any disclaimer, the term of this patent is extended or adjusted under 35 U.S.C. 154(b) by 0 days.

(21) Appl. No.: 14/357,585

(22) PCT Filed: Nov. 23, 2012

(86) PCT No.: PCT/IB2012/056680
§ 371 (c)(1),
(2) Date: May 13, 2014

(87) PCT Pub. No.: WO2013/076700
PCT Pub. Date: May 30, 2013

(65) Prior Publication Data
US 2014/0323674 A1     Oct. 30, 2014

(30) Foreign Application Priority Data
Nov. 25, 2011 (IT) .............................. MI2011A2156

(51) Int. Cl.
| | | |
|---|---|---|
| C08C 2/06 | (2006.01) |
| C08J 3/00 | (2006.01) |
| C08C 2/00 | (2006.01) |
| C08F 6/10 | (2006.01) |
| C08C 2/04 | (2006.01) |

(52) U.S. Cl.
CPC ... C08J 3/00 (2013.01); C08C 2/00 (2013.01); C08C 2/06 (2013.01); C08F 6/10 (2013.01); C08J 2309/06 (2013.01)

(58) Field of Classification Search
USPC .................................................. 528/483, 500
See application file for complete search history.

(56) References Cited

U.S. PATENT DOCUMENTS

| | | |
|---|---|---|
| 3,337,422 A | 8/1967 | White |
| 3,462,347 A | 8/1969 | Chapman et al. |
| 4,136,103 A | 1/1979 | Oswald |
| 4,278,506 A | 7/1981 | Irvin |
| 4,408,039 A * | 10/1983 | Irvin .............................. 528/500 |
| 4,909,989 A | 3/1990 | Fukazawa et al. |
| 5,283,021 A | 2/1994 | Shih |
| 5,478,509 A | 12/1995 | King et al. |
| 5,747,560 A | 5/1998 | Christiani et al. |
| 5,952,093 A | 9/1999 | Nichols et al. |
| 6,150,498 A | 11/2000 | Abel et al. |
| 2006/0193197 A1 | 8/2006 | Fleury |

FOREIGN PATENT DOCUMENTS

| | | |
|---|---|---|
| CN | 100457814 C | 2/2009 |
| GB | 1374709 A | 11/1974 |

OTHER PUBLICATIONS

International Search Report dated Mar. 26, 2013 for PCT/IB2012/056680.

* cited by examiner

*Primary Examiner* — Terressa Boykin
(74) *Attorney, Agent, or Firm* — Pearne & Gordon LLP

(57) ABSTRACT

A process for the removal of solvent from a polymeric solution including at least one elastomeric polymer. The polymeric solution is subjected to a stripping step by means of water vapor, in the presence of a dispersant system including: from 0.005% by weight to 1% by weight, with respect to the total weight of the dry elastomeric polymer, of at least one lamellar material; from 0.0005% by weight to 1% by weight, with respect to the total weight of the dry elastomeric polymer, of at least one cationic surfactant.

13 Claims, 1 Drawing Sheet

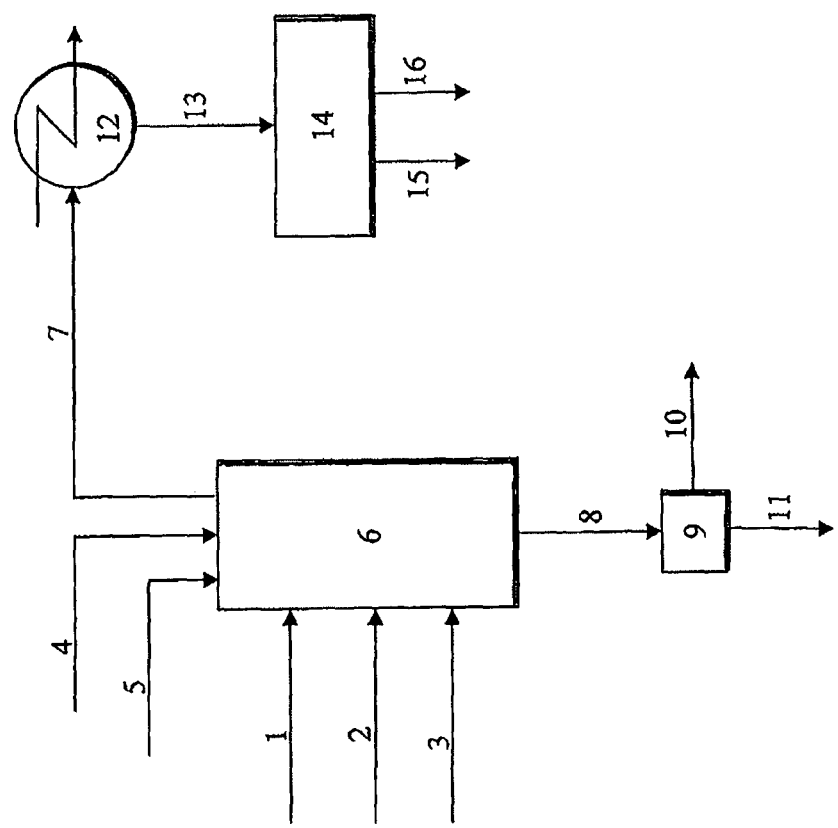

PROCESS FOR THE REMOVAL OF THE SOLVENT FROM A POLYMERIC SOLUTION

The present invention relates to a process for the removal of the solvent from a polymeric solution.

More specifically, the present invention relates to a process for the removal of the solvent from a polymeric solution which includes at least one elastomeric polymer, comprising subjecting said polymeric solution to a stripping step by means of water vapour, in the presence of a dispersant system including at least one lamellar material and at least one cationic surfactant.

As is known, the removal of the solvent from polymeric solutions in order to obtain polymers in solid state, can be divided into two process types defined as "Traditional Technology" and "Direct Devolatilization" respectively.

The term "Traditional Technology" refers to a technology described, for example, in American patents U.S. Pat. Nos. 3,337,422, 3,462,347 or 4,278,506, whereas the term "Direct Devolatilization" refers to a technology which provides the evaporation of the solvent contained in the polymeric solution in specific machines that treat the polymer in continuous solid phase or in the form of granules, as described, for example, in American patents U.S. Pats. No. 4,909,989, 5,283,021, 5,478, 509, 6,150,498, or in American patent application U.S. 2006/193197.

The "Traditional Technology" generally comprises a first section ("steam stripping") and a second section (drying).

In the first section, the polymeric solution is fed to a stripper containing water (water bath) to which a stream of water vapour is also fed. An aliquot of the water vapour condenses providing the heat necessary for the evaporation of the solvent: a suspension of lumps of polymer in water is obtained, with a sufficiently low residual content of solvent. Furthermore, in said first section, the use is envisaged of a dispersant system, in order to avoid the cohesion of the polymer lumps and to maintain the suspension in a stable form which allows it to be pumped.

In the second section, the polymer lumps are dried (elimination of the water contained in the lumps) through mechanical removal (squeezing) followed by evaporation of the water. These two operations, i.e. mechanical removal and evaporation, are generally carried out in two different extruders. The first extruder compresses the lumps of polymer, allowing the outflow of water in liquid form, whereas the second extruder allows the evaporation of the residual water as, due to dissipation of mechanical energy, the temperature of the polymeric phase increases, allowing, in suitable degassing areas, the "flash" of water in the form of vapour.

In short, the "Traditional Technology" provides a first step in which the solvent is removed by evaporation through the use of water vapour, and a second step, in which said water is removed in both liquid phase, by squeezing, and in vapour phase, through the energy provided by mechanical dissipation.

As mentioned above, the "Traditional Technology" therefore provides feeding the polymeric solution and vapour to a stripper containing water (water bath). The evaporation of the solvent, however, can cause the formation of lumps of polymer which still contain a certain amount of solvent. Consequently, in the "Traditional Technology" the polymer is discharged as "slurry", i.e. lumps suspended in water.

In order to prevent blockages and obstructions of the stripper and discharge lines, and also of the extruders used for the drying, it is therefore fundamental to guarantee the correct dimension of the polymer lumps and to avoid the possibility of their agglomeration. In order to avoid these phenomena, the "Traditional Technology" provides the addition of a dispersant system to the water contained in the stripper, which is aimed at reducing the possibility of agglomeration. In the case of styrene copolymers, such as styrene-butadiene (SB) copolymers or styrene-butadiene-styrene (SBS) copolymers, or polybutadiene (BR), for example, a dispersant system is generally used comprising an organic dispersant (e.g. Sopropon® T 36 of Rhone-Poulenc, Geropon® T/36 of Rodhia, Orotan® 731K of Rhom & Haas) and calcium chloride, whereas in the case of olefinic copolymers such as, for example, ethylene-propylene (EP) copolymers or ethylene-propylene-diene (EPDM) copolymers, talc in dispersion is used.

The use of said dispersant systems, however, can cause various drawbacks. The use of the organic dispersants mentioned above and calcium chloride, for example, can cause localized corrosion phenomena in the stripper due to the presence of free chlorides and can worsen the quality of the end-product as it can confer a certain alkalinity to the polymer obtained, thus favouring the development of undesired colourings in the final product.

The "Direct Devolatization" process, on the contrary, provides feeding the polymeric solution to a machine capable of supplying the process with the energy necessary for the evaporation of the solvent through heat exchange to the wall and dissipation of mechanical energy. These machines are capable of treating extremely viscous fluids, semi-solids, in which the mixing system, by exploiting the same viscosity of the polymeric phase, is the means through which the mechanical friction energy is dissipated as heat supplied to the polymeric phase which allows the evaporation of the solvent.

For this type of process, the contribution to the energy balance is given by the exchange of heat through the wall of the machine which, the higher the viscosity of the product (i.e. the lower the concentration of the residual solvent), the more the heat exchange will be reduced.

As the coefficients of heat exchange through the walls are low, acceptable results can be obtained by using machines having small dimensions, whereas for machines having industrial dimensions (with a reduced ratio surface/volume) there is a substantial marginality of the contribution of exchange to the wall.

Said "Direct Devolatization" minimizes the energy necessary for the removal of the solvent by evaporation, as only the vaporization energy of the solvent is supplied to the process, together with a small amount of sensitive heat linked to the heating of the polymeric phase. This energy, however, is supplied to the system mainly as dissipation of mechanical energy, i.e. as consumption of the electric energy used for the activation of the motor of the mixing system of the machine.

The cost of electric energy is, at an equal energy used in the process, higher than that of vapour. Starting from this consideration, it can be demonstrated that the minimization of the energy used in the "Direct Devolatization" process does not minimize the cost of the energy itself.

The Applicant has therefore considered the problem of finding a process for the removal of the solvent from a polymeric solution, in particular from a polymeric solution comprising at least one elastomeric polymer, capable of overcoming the drawbacks mentioned above.

The Applicant has now found that the removal of the solvent from a polymeric solution can be advantageously carried out, by subjecting said polymeric solution to a stripping step by means of water vapour, in the presence of a dispersant system including at least one lamellar material and at least one cationic surfactant. Said process allows to avoid both the above-mentioned corrosion phenomena, and also the presence of colouring in the end-product. Furthermore, said process allows much lower amounts of compounds present in the dispersant system (i.e. lamellar material and cationic surfactant) to be used, than the amounts of compounds present in the dispersant system known in the art described above (i.e. organic dispersant and calcium chloride). Said process, moreover, allows lumps of polymer to be obtained, having a good compromise between apparent density and average dimension, thus avoiding problems of overheating or even self-triggering of the polymer itself during the drying of the lumps which normally takes place in one or more extruders, in addition to deterioration of the end-product.

An object of the present invention therefore relates to a process for the removal of the solvent from a polymeric solution including at least one elastomeric polymer, which comprises subjecting said polymeric solution to a stripping step by means of water vapour, in the presence of a dispersant system including:

from 0.005% by weight to 1% by weight, preferably from 0.008% by weight to 0.8% by weight, with respect to the total weight of the dry elastomeric polymer, of at least one lamellar material;

from 0.0005 by weight to 1% by weight, preferably from 0.0008% by weight to 0.8% by weight, with respect to the total weight of the dry elastomeric polymer, of at least one cationic surfactant.

For the purposes of the present description and of the following claims, the definitions of the numerical ranges always include the extremes, unless otherwise specified.

According to a preferred embodiment of the present invention, said elastomeric polymer can be selected from: polybutadiene (BR); polyisoprene (IR); unsaturated styrene copolymers with a random, block, tapered distribution, linear or branched such as, for example, styrene-butadiene (SB) copolymers, styrene-butadiene-styrene (SBS) copolymers, styrene-isoprene-styrene (SIS) copolymers; saturated styrene copolymers, with a random, block, tapered distribution, linear or branched such as styrene-ethylene-propylene (SEP) copolymers, styrene-ethylene/butylene-styrene (SEBS) copolymers, styrene-ethylene-propylene-styrene (SEPS) copolymers; or mixtures thereof. Styrene-butadiene (SB) copolymers and styrene-butadiene-styrene (SBS) copolymers, are preferred.

According to a preferred embodiment of the present invention, said polymeric solution comprises at least one non-polar organic solvent which can be selected, for example, from: butane, pentane, cyclopentane, hexane, benzene, toluene, cyclohexane, methylcyclohexane, chlorobenzene, or mixtures thereof. Hexane, cyclohexane, or mixtures thereof, are preferred.

According to a preferred embodiment of the present invention, said elastomeric polymer is present in said polymeric solution in a quantity ranging from 2% by weight to 30% by weight, more preferably ranging from 5% by weight to 20% by weight, with respect to the total weight of the polymeric solution.

According to a preferred embodiment of the present invention, said lamellar material has lamellas having a thickness ranging from 0.01 nm to 30 nm, preferably ranging from 0.2 nm to 15 nm, even more preferably ranging from 0.5 nm to 2 nm.

According to a preferred embodiment of the present invention, said lamellar material can be selected, for example, from phyllosilicates such as: smectites, for example montmorillonite, bentonite, nontronite, beidellite, volkonskoite, hectorite, saponite, sauconite, magadite, stevensite, or mixtures thereof; vermiculite; halloysite; sericite; aluminate oxides; hydrotalcite; or mixtures thereof. Montmorillonite is preferred. Said lamellar material normally contains interchangeable cations, such as, for example, sodium ($Na^+$), calcium ($Ca^{2+}$), potassium ($K^+$), or magnesium ($Mg^{2+}$), present on the surface of the lamellae.

According to a further preferred embodiment of the present invention, said lamellar material can be modified with alkyl ammonium or alkyl phosphonium salt, which can be selected, for example, from quaternary ammonium or phosphonium salts having general formula (I):

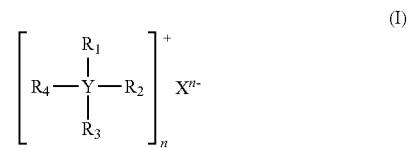

wherein:

Y represents N or P;

$R_1$, $R_2$, $R_3$ and $R_4$, equal to or different from each other, represent a linear or branched $C_1$-$C_{20}$ alkyl or hydroxyalkyl group; a linear or branched $C_2$-$C_{20}$ alkenyl or hydroxyalkenyl group; a group —$R_5$—SH or —$R_5$—NH wherein $R_5$ represents a linear or branched $C_1$-$C_{20}$ alkylene group; a $C_6$-$C_{18}$ aryl group; a $C_7$-$C_{20}$ arylalkyl or alkylaryl group; a $C_5$-$C_{18}$ cycloalkyl group; said cycloalkyl group optionally containing heteroatoms such as, for example, oxygen, nitrogen, sulfur;

$X^{n-}$ represents an anion such as, for example, a chloride ion, a sulfate ion, a phosphate ion;

n represents 1, 2 or 3.

Said ammonium or phosphonium salt can be subjected to an ion exchange reaction with the ions which, as described above, are present on the surfaces of the lamellar materials.

If a lamellar material modified with at least one alkyl ammonium or alkyl phosphonium salt is used, its modification can be carried out by treating said lamellar material with at least one alkyl ammonium or alkyl phosphonium salt, before being used in the above-mentioned stripping step.

The treatment of the lamellar material with at least one alkyl ammonium salt or with at least one alkyl phosphonium salt, can be carried out according to methods known in the art, such as, for example, through an ion exchange reaction between the lamellar material and at least one ammonium alkyl or phosphonium alkyl salt: further details relating to this treatment can be found, for example, in American patents U.S. Pat. Nos. 4,136,103, 5,747,560, or 5,952,093.

Alternatively, a lamellar material can be used, already modified with at least one ammonium alkyl or phosphonium alkyl salt which can be selected from modified lamellar materials present on the market.

Examples of lamellar materials which can be used for the purposes of the present invention and which are available on the market are the products known under the name of Dellite® LFV, HPS, Dellite® 67G, Dellite® 72T, Dellite® 43B, of Laviosa Chimica Mineraria S.p.A.; Cloisite® Na, Cloisite® 25A, Cloisite® 10A, Cloisite® 15A, Cloisite® 20A, of Southern Clays; Nanofil® 8, Nanofil® 9, of Süd Chemie; Bentonite® AG/3, of Dal Cin S.p.A.

In order to improve the activity of the lamellar material in said stripping step, said lamellar material can be subjected to a previous delamination treatment.

According to a preferred embodiment of the present invention, said lamellar material can be subjected to a delamination step.

Preferably, said delamination step can be carried out by subjecting an aqueous solution of said lamellar material to stirring in a mixer or centrifuge. Said aqueous solution preferably comprises from $2.5 \times 10^{-5}\%$ by weight to $5 \times 10^{-3}\%$ by weight, more preferably from $4 \times 10^{-5}\%$ by weight to $4 \times 10^{-3}\%$ by weight, of lamellar material with respect to the total weight of the aqueous solution. Preferably, said delamination step can be carried out at a rate ranging from 1,000 rpm to 20,000 rpm, more preferably ranging from 5,000 rpm to 10,000 rpm, at a temperature ranging from 10° C. to 40° C., more preferably ranging from 15° C. to 25° C., for a time ranging from 10 minutes to 3 hours, more preferably ranging from 30 minutes to 1 hour.

According to a preferred embodiment of the present invention, said cationic surfactant can be selected from ammonium alkyl or phosphonium alkyl salts having general formula (I) described above.

Examples of ammonium alkyl or phosphonium alkyl salts which can be used in accordance with the present invention and which are available on the market, are the products known under the name of Arquad® HC Pastilles, Arquad® T-50, Arquad® 2HT-75, Arquad® MC-50, Duoquad® T50, of Akzo Nobel, or Bardac® LF 70 of Lonza.

At the end of said stripping step, the lumps of elastomeric polymer obtained are subjected to a drying step which can be carried out, for example, by means of one or more extruders.

Said stripping step, in addition to said drying step, are carried out using operative conditions known in the art with respect to the above-mentioned "Traditional Technology": further details can be found, for example, in American patents U.S. Pat. Nos. 3,337,422, 3,462,347 or 4,278,506, mentioned above.

The present invention will now be illustrated in greater detail by means of an illustrative embodiment with reference to FIG. 1 indicated hereunder.

FIG. 1 illustrates a first embodiment of the process, object of the present invention.

As represented in FIG. 1, demineralized water (2) is fed to the stripper (6), equipped with a mechanical stirrer (not represented in FIG. 1), preferably until a third of its theoretical capacity is reached. The stirrer of the stripper (6) is then activated and water vapour (3) is fed at such a flow-rate as to bring the temperature of the water to a value lower than or equal to 95° C., to prevent premature boiling of the water.

The lamellar material (4), for example Dellite® LVF previously subjected to delamination, the cationic surfactant (5), for example Arquad® T-50, and the polymeric solution (1), for example a solution of styrene-butadiene-styrene (SBS) copolymer (Europrene® SOL T161B of Polimeri Europa) in cyclohexane, are subsequently fed, in sequence, to the stripper (6): at this point the flow-rate of the water vapour (3) is increased, thus bringing the temperature of the water to a value lower than or equal to 98° C. Said polymeric solution (1), can come directly from the production plant of the polymer (not represented in FIG. 1).

The vapours produced during the mixing in the stripper (6), essentially comprising non-condensed water vapour and vapours of the solvent (7), are discharged through a valve present in the head of the stripper (6) (not represented in FIG. 1) and sent to the condenser (12). The aqueous phase comprising condensed water vapour and condensed solvent (13), leaving the condenser (12), is sent to the decanter (14) from which a stream of water (15) together with a stream of solvent (16) are recovered which are sent for further treatments (not illustrated in FIG. 1). The solvent obtained from said further treatments can optionally be anhydrified on an anhydrification column and can be re-used in the polymerization process (e.g., it can be re-sent, optionally with the addition of fresh solvent, to the production plant of the polymer).

The polymeric solution (8), comprising the lumps of elastomeric polymer and water, leaves the bottom of the stripper (6), through a valve (not represented in FIG. 1), and is sent to a filter (9) from which a stream of water (10), which is sent to a specific sewer, or for further treatments (not illustrated in FIG. 1), or it can be re-used in the process (i.e. it can be sent to the stripper (6)], and the lumps of the elastomeric polymer (11) that are sent to the drying step, for example, to one or more extruders (not represented in FIG. 1), are recovered:

Some illustrative and non-limiting examples are provided hereunder for a better understanding of the present invention and for its embodiment.

EXAMPLES

The characterization and analysis techniques indicated hereunder were used.

Apparent Density

The apparent density was obtained by filling a 2000 ml cylinder with a known volume of dried lumps of elastomeric polymer, weighing the mass, obtaining the total mass and subtracting the mass of the cylinder from the total mass. Three measurements were carried out: the above cylinder was filled with 1000 ml, with 1500 ml and with 2000 ml and the apparent density value is the average quantity weighed of the three values obtained.

Average Particle-Size (D50)

The average particle-size (D50) was obtained by measuring with a gauge, a representative quantity of dried polymer lumps for each test, i.e. 100 g.

Example 1

0.1 g of Dellite® LVF (montmorillonite belonging to the family of smectites of Laviosa Chimica Mineraria S.p.A.) and 1 l of demineralized water, were introduced into an Ultraturax mixer: the whole mixture was put, under stirring, at 1,000 rpm, at room temperature (25° C.), for 30 minutes.

0.01 g of Arquad® T-50 (trimethylammonium chloride tallow of Akzo Nobel) were dissolved in 500 ml of demineralized water.

17 l of demineralized water were fed to a 50 l stripper, equipped with a mechanical stirrer. The mechanical stirrer of the stripper was then activated at a rate of 600 rpm and water vapour was fed at such a flow-rate as to bring the temperature of the water to 95° C. 2 l of the solution of Dellite® LVF obtained as described above (concentration of Dellite® LVF in the stripper equal to 0.01% by weight with respect to the total weight of the dry styrene-butadiene-styrene (SBS) copolymer), 0.51 l of the solution of Arquad® T-50 obtained as described above ((concentration of Arquad® T-50 in the stripper equal to 0.001% by weight with respect to the total weight of the dry styrene-butadiene-styrene (SBS) copolymer), 7.5 kg of a polymeric solution, in cyclohexane, containing 13% by weight with respect to the total weight of said polymeric solution of styrene-butadiene-styrene (SBS) copolymer (Europrene® SOL T161B of Polimeri Europa), were subsequently fed in sequence, at a flow-rate equal to 6 kg/h: at this point, the flow-rate of the water vapour was increased thus bringing the temperature of the water to 98° C.

The vapours produced during the mixing, essentially comprising non-condensed water vapour and vapours of cyclohexane, were discharged through a valve present in the head of the stripper and sent to a condenser. The aqueous phase comprising condensed water vapour and condensed cyclohexane, leaving the condenser, was sent to a decanter in which a stream of water and a stream of cyclohexane are separated, which are sent for further treatments.

At the end of the feeding of the above polymeric solution, the valve was opened on the bottom of the stripper and the polymeric solution comprising lumps of styrene-butadiene-styrene (SBS) copolymer and water, leaving the bottom of the stripper, was sent to a filter from which a stream of water which was sent to a specific sewer, together with lumps of styrene-butadiene-styrene (SBS) copolymer which were sent to the drying step, were recovered.

The lumps of styrene-butadiene-styrene (SBS) copolymer obtained, after being sent to the drying step, were subjected to measurement of the apparent density and of the average particle-size operating as described above. The results obtained are the following:
apparent density: 93.2 g/l;
average particle diameter: 1 cm.

Example 2

Comparative 17 l of demineralized water were fed to a 50 l stripper equipped with a mechanical stirrer. The mechanical stirrer of the stripper was then activated at a rate of 600 rpm and water vapour was fed. 0.5 l of an aqueous solution containing 1.5 g of the dispersant Sopropon® T 36 (concentration of Sopropon® T 36 in the stripper equal to 0.15% by weight with respect to the total weight of the dry styrene-butadiene-styrene (SBS) copolymer), 0.5 l of an aqueous solution containing 0.15 g of calcium chloride (concentration of calcium chloride in the stripper equal to 0.015% by weight with respect to the total weight of the dry styrene-butadiene-styrene (SBS) copolymer), 7.5 kg of a polymeric solution, in cyclohexane, containing 13% by weight with respect to the total weight of said polymeric solution of styrene-butadiene-styrene (SBS) copolymer (Europrene® SOL T161B of Polimeri Europa), were subsequently fed in sequence, at a flow-rate equal to 6 kg/h: at this point, the flow-rate of the water vapour was increased thus bringing the temperature of the water to 98° C.

The vapours produced during the mixing, essentially comprising non-condensed water vapour and vapours of cyclohexane, were discharged through a valve present in the head of the stripper and sent to a condenser. The aqueous phase comprising condensed water vapour and condensed cyclohexane, leaving the condenser, was sent to a decanter in which a stream of water and a stream of cyclohexane are separated, which are sent for further treatments.

At the end of the feeding of the above polymeric solution, the valve was opened on the bottom of the stripper and the polymeric solution comprising lumps of styrene-butadiene-styrene (SBS) copolymer and water, leaving the bottom of the stripper, was sent to a filter from which a stream of water which was sent to a specific sewer, together with lumps of styrene-butadiene-styrene (SBS) copolymer which were sent to the drying stepm, were recovered.

The lumps of styrene-butadiene-styrene (SBS) copolymer obtained, after being sent to the drying step, were subjected to measurement of the apparent density and of the average particle-size operating as described above. The results obtained are the following:
apparent density: 96.2 g/l;
average particle diameter: 1 cm
From the data reported above, it can be deduced that the apparent density and the average particle diameter of the lumps of styrene-butadiene-styrene (SBS) copolymer have values similar to those obtained in Example 1 (invention) having used, however, a quantity of compounds, i.e. Sopropon® T 36 and calcium chloride, an order of magnitude higher.

The invention claimed is:

1. A process for the removal of the solvent from a polymeric solution including at least one elastomeric polymer, which comprises subjecting said polymeric solution to a stripping step by means of water vapour, in the presence of a dispersant system comprising:
from 0.005% by weight to 1% by weight with respect to the total weight of the dry elastomeric polymer of at least one lamellar material;
from 0.0005% by weight to 1% by weight with respect to the total weight of the dry elastomeric polymer of at least one cationic surfactant.

2. The process for the removal of the solvent from a polymeric solution according to claim 1, wherein said dispersant system comprises from 0.008% by weight to 0.8% by weight with respect to the total weight of the dry elastomeric polymer of at least one lamellar material.

3. The process for the removal of the solvent from a polymeric solution according to claim 1, wherein said dispersant system comprises from 0.0008% by weight to 0.8% by weight with respect to the total weight of the dry elastomeric polymer of at least one cationic surfactant.

4. The process for the removal of the solvent from a polymeric solution according to claim 1, wherein said elastomeric polymer is selected from: polybutadiene (BR); polyisoprene (IR); unsaturated styrene copolymers with a random, block, tapered distribution, linear or branched such as styrene-butadiene (SB) copolymers, styrene-butadiene-styrene (SBS) copolymers, styrene-isoprene-styrene (SIS) copolymers; saturated styrene copolymers, with a random, block, tapered distribution, linear or branched such as styrene-ethylene-propylene (SEP) copolymers, styrene-ethylene/butylene-styrene (SEBS) copolymers, styrene-ethylene-propylene-styrene (SEPS) copolymers; or mixtures thereof.

5. The process for the removal of the solvent from a polymeric solution according to claim 1, wherein said polymeric solution comprises at least one non-polar organic solvent which is selected from: butane, pentane, cyclopentane, hexane, benzene, toluene, cyclohexane, methylcyclohexane, chlorobenzene, or mixtures thereof.

6. The process for the removal of the solvent from a polymeric solution according to claim 1, wherein said elastomeric polymer is present in said polymeric solution in a quantity ranging from 2% by weight to 30% by weight with respect to the total weight of the polymeric solution.

7. The process for the removal of the solvent from a polymeric solution according to claim 1, wherein said lamellar material has lamellae having a thickness ranging from 0.01 nm to 30 nm.

8. The process for the removal of the solvent from a polymeric solution according to claim 1, wherein said lamellar material is selected from phyllosilicates such as: smectites, such as montmorillonite, bentonite, nontronite, beidellite, volkonskoite, hectorite, saponite, sauconite, magadite, stevensite, or mixtures thereof; vermiculite; halloysite; sericite; aluminate oxides; hydrotalcite; or mixtures thereof.

9. The process for the removal of the solvent from a polymeric solution according to claim 8, wherein said lamellar material is modified with an alkyl ammonium or alkyl phosphonium salt which is selected from quaternary ammonium or phosphonium salts having general formula (I):

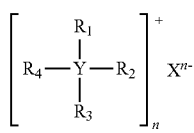

(I)

wherein:

Y represents N or P;

$R_1$, $R_2$, $R_3$ and $R_4$, the same or different, represent a linear or branched $C_1$-$C_{20}$ alkyl or hydroxyalkyl group; a linear or branched $C_2$-$C_{20}$ alkenyl or hydroxyalkenyl group; a group —$R_5$—SH or —R—NH wherein $R_5$ represents a linear or branched $C_1$-$C_{20}$ alkylene group; a $C_6$-$C_{18}$ aryl group; a $C_7$-$C_{20}$ arylalkyl or alkylaryl group; a $C_5$-$C_{18}$ cycloalkyl group; said cycloalkyl group optionally containing heteroatoms such as oxygen, nitrogen, sulfur;

$X^{n-}$ represents an anion such as a chloride ion, a sulfate ion, a phosphate ion;

n represents 1, 2 or 3.

10. The process for the removal of the solvent from a polymeric solution according to claim 1, wherein said lamellar material is subjected to a delamination step.

11. The process for the removal of the solvent from a polymeric solution according to claim 10, wherein said delamination step is carried out by subjecting an aqueous solution of said lamellar material to stirring in a mixer, or in a centrifuge, at a rate ranging from 1,000 rpm to 20,000 rpm, at a temperature ranging from 10° C. to 40° C., for a time ranging from 10 minutes to 3 hours.

12. The process for the removal of the solvent from a polymeric solution according to claim 11, wherein said aqueous solution comprises from $2.5 \times 10^{-5}$% by weight to $5 \times 10^{-3}$% by weight of lamellar material with respect to the total weight of the aqueous solution.

13. The process for the removal of the solvent from a polymeric solution according to claim 1, wherein said cationic surfactant is selected from alkyl ammonium or alkyl phosphonium salts having general formula (I):

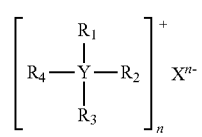

(I)

wherein:

Y represents N or P;

$R_1$ $R_2$ $R_3$ and $R_4$, the same or different, represent a linear or branched $C_1$-$C_{20}$ alkyl or hydroxyalkyl group; a linear or branched $C_2$-$C_{20}$ alkenyl or hydroxyalkenyl group; a group —$R_5$—SH or —$R_5$—NH wherein $R_5$ represents a linear or branched $C_1$-$C_{20}$ alkylene group; a $C_6$-$C_{18}$ aryl group; a $C_7$-$C_{20}$ arylalkyl or alkylaryl group; a $C_5$-$C_{18}$ cycloalkyl group; said cycloalkyl group optionally containing heteroatoms such as oxygen, nitrogen, sulfur;

$X^{n-}$ represents an anion such as a chloride ion, a sulfate ion, a phosphate ion;

n represents 1, 2 or 3.

* * * * *

UNITED STATES PATENT AND TRADEMARK OFFICE
CERTIFICATE OF CORRECTION

PATENT NO.         : 9,090,746 B2
APPLICATION NO.    : 14/357585
DATED              : July 28, 2015
INVENTOR(S)        : Parisi et al.

Page 1 of 1

It is certified that error appears in the above-identified patent and that said Letters Patent is hereby corrected as shown below:

In the specification:

On column 4, line 60, please delete "HPS" and insert --Dellite® HPS--

In the claims:

On column 9, line 14, claim 9, please delete "R" and insert --$R_5$--

Signed and Sealed this
Nineteenth Day of January, 2016

Michelle K. Lee
*Director of the United States Patent and Trademark Office*